(12) United States Patent
Davis et al.

(10) Patent No.: US 6,394,529 B2
(45) Date of Patent: *May 28, 2002

(54) VEHICLE WINDOW ASSEMBLY (75) Inventors: Timothy A. Davis, Byron Center; Loren B. Renkema, Wyoming, both of MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/939,156

(22) Filed: Aug. 24, 2001

Related U.S. Application Data

(60) Continuation of application No. 09/801,202, filed on Mar. 7, 2001, now Pat. No. 6,299,235, which is a division of application No. 09/611,727, filed on Jul. 7, 2000, now Pat. No. 6,220,650.

(51) Int. Cl.$^7$ ................................................. B60J 10/02
(52) U.S. Cl. ................. 296/146.16; 296/201; 49/490.1; 49/502
(58) Field of Search ....................... 296/146.16, 146.15, 296/146.1, 201, 89, 190.1; 49/440, 490.1, 502, 475.1

(56) References Cited

U.S. PATENT DOCUMENTS

| | | | |
|---|---|---|---|
| 2,762,648 A | 9/1956 | Huzzard | |
| 4,119,341 A | 10/1978 | Cook | |
| 4,454,688 A | 6/1984 | Rest et al. | 49/502 |
| 4,604,830 A | 8/1986 | Maeda et al. | 49/374 |
| 4,608,779 A | 9/1986 | Maeda et al. | 49/374 |
| 4,656,784 A | 4/1987 | Brachmann | 49/491 |
| 4,793,099 A | 12/1988 | Friese et al. | |
| 4,875,307 A | 10/1989 | Barbero | 49/374 |
| 4,932,161 A | 6/1990 | Keys et al. | 49/491 |
| 5,040,333 A | 8/1991 | Mesnel et al. | 49/374 |
| 5,054,242 A | 10/1991 | Keys et al. | 49/491 |
| 5,139,307 A | 8/1992 | Koops et al. | 296/201 |
| 5,345,717 A | 9/1994 | Mori et al. | 296/146.16 |
| 5,345,719 A | 9/1994 | Karwande | 49/502 |
| 5,551,197 A | 9/1996 | Repp et al. | 52/204.62 |
| 5,566,510 A | 10/1996 | Hollingshead et al. | 49/479.1 |
| 5,702,148 A | 12/1997 | Vaughan et al. | 296/146.9 |
| 5,732,509 A | 3/1998 | Buehler et al. | 49/440 |
| 5,743,047 A | 4/1998 | Bonne et al. | 49/490.1 |
| 5,779,956 A | 7/1998 | Hollingshead et al. | 264/138 |
| 5,791,088 A | 8/1998 | Martinelli et al. | 49/375 |
| 5,846,463 A | 12/1998 | Keeney et al. | 264/135 |
| 5,853,895 A | 12/1998 | Lewno | 425/425.6 |
| 5,935,356 A | 8/1999 | Soldner | 156/71 |
| 6,220,650 B1 | 4/2001 | Davis et al. | 296/146.16 |

FOREIGN PATENT DOCUMENTS

FR    1166064    11/1958    ........ 296/146.16

OTHER PUBLICATIONS

Commonly assigned, co-pending U.S. Patent Application, Ser. No. 09/801,202, entitled Vehicle Window Assembly, filed Mar. 7, 2001 by Timothy A. Davis and Loren B. Renkema.

*Primary Examiner*—Joseph D. Pape
(74) *Attorney, Agent, or Firm*—Van Dyke, Gardner, Linn & Burkhart, LLP (57) ABSTRACT

A window assembly module for a vehicle comprises at least one fixed window panel having an inner surface and an outer surface, a movable window panel having an inner surface and an outer surface, and a frame configured to secure to the vehicle. The inner surface of the at least one fixed window panel is secured to the frame. The movable window panel is movable relative to the frame. The frame includes a portion separating the at least one fixed window panel and the movable window panel. The portion of the frame is adapted to maintain the outer surface of the movable window panel generally flush with the outer surface of the fixed window panel as the movable window panel is moved relative to the frame. The window assembly is suitable for use as either a side door window of a vehicle or a rear window of a vehicle.

53 Claims, 8 Drawing Sheets

FIG. 17

VEHICLE WINDOW ASSEMBLY

CROSS-REFERENCE TO RELATED APPLICATIONS

This is a continuation of U.S. patent application, Ser. No. 09/801,202, filed Mar. 7, 2001, now U.S. Pat. No. 6,299,235 which is a division of U.S. patent application, Ser. No. 09/611,727, filed Jul. 7, 2000, by Timothy A. Davis and Loren B. Renkema, entitled VEHICLE WINDOW ASSEMBLY, now U.S. Pat. No. 6,220,650, which are hereby incorporated by reference herein.

BACKGROUND OF THE INVENTION

This invention relates generally to vehicle window assemblies and, more particularly, to a vehicle window assembly having both a fixed window and a movable window.

Often, a rear side door of a sedan or other similar vehicle includes a fixed, generally triangular shaped window and a larger, rectangular or other shaped movable window. The smaller fixed window, commonly referred to as a vent window or fixed vent, is typically required in order to avoid interference of the movable window with the rear wheel well of the vehicle when the window is lowered. By placing the larger rectangular movable window forward of the fixed window, the larger movable window may be completely lowered to a fully opened position, while the fixed vent window does not detract from visibility through the windows by the driver or passengers of the vehicle.

Because the movable window slides upwardly and downwardly adjacent to the fixed vent window, the molding or trim surrounding the fixed vent window must include a track or channel along its forward edge for slidable engagement of the movable window with the track or channel. This results in a portion of the seal or gasket between the two windows extending outwardly and overlapping an outer surface of the windows along the adjacent edges thereof. This further results in a lack of surface continuity between the windows, which not only detracts from the styling and appearance of the vehicle, but may cause aerodynamic drag and wind noise as the vehicle is being driven. Also, the seals between the window panels and door frames are typically glued together at the where a division post seal meets and adjoins with a header seal. This may result in air and/or water leakage at these corners due to the lack of surface continuity along the seals where their ends are glued or otherwise adhered together.

An additional concern with these rear door window assemblies is that they are made up of several parts, which must be tightly sealed in order to prevent water leakage or wind noise. Due to the large number of channels, fasteners and seals that are typically implemented in these window assemblies, water leakage may result when the parts do not fit together precisely. Additional clips and fasteners have also been proposed to facilitate tight securement of the assemblies to the vehicle. However, the numerous parts of the assemblies add to the cost of the door and window assembly and further require additional assembly processes in order to properly install them to the vehicle.

Other window modules have been proposed which mold a corner seal at an upper end of the division post where it adjoins the header of the doorframe. An encapsulating trim and seal may also be formed around the fixed window and a portion of the division post and header strip. While such modules may provide a more uniform curved seal at the corners where the division post meets the header strip, they require numerous separate parts and processes. Each post and strip, along with their respective seals, must be properly aligned within a mold, which then forms a generally T-shaped seal portion which interconnects with the seals of the header strip and the division post. The seals of these window modules also extend outwardly from an exterior surface of the windows along the adjacent edge thereof.

Although a window assembly having a fixed vent window panel and a movable window panel is typically implemented at a side door of a vehicle, similar window assemblies with a movable window panel sliding between a pair of fixed window panels may be implemented at a rear window or back lite of a vehicle, such as a pickup truck or the like. Both of the side, fixed panels then include channels or track therealong for slidable engagement by the movable window panel. This results in a portion of the track and/or seals protruding between the windows, which again results in a lack of surface continuity between the windows and thus detracts from the styling and appearance of the vehicle.

Therefore, there is a need in the art for a vehicle window assembly which provides both fixed and movable windows with a tight seal around the windows to minimize air and water leakage therethrough. Furthermore, the window assembly should require a minimal number of separate parts and processes in order to properly install the assembly to the vehicle door.

SUMMARY OF THE INVENTION

The present invention is intended to provide a window assembly for a vehicle, and especially for a rear side door of a vehicle, with surface continuity between a fixed window and a movable window of the assembly, thereby improving the appearance of the door and minimizing drag and wind noise when the vehicle is in motion. The invention is equally applicable to back lite window assemblies, such as rear windows for pickup trucks and the like, where a movable window panel is slidable between a pair of fixed panels.

According to a first aspect of the present invention, a window assembly module for a vehicle is assembled remotely from a vehicle assembly plant and is installed at the vehicle at the vehicle assembly plant. The window assembly module comprises a frame adapted to secure to the vehicle, at least one fixed window panel and a movable window panel. The frame includes a perimeter frame and at least one dividing member extending between a pair of perimeter legs of the perimeter frame. The fixed window panel has an inner surface and outer surface and is securable to the perimeter frame and dividing member. The movable panel has an inner surface and outer surface and first and second perimeter edges. The movable window panel is slidably positioned at the frame such that the first perimeter edge is slidably engagable with the dividing member and the second perimeter edge is slidably engageable with another dividing member or one of the perimeter legs. The outer surfaces of the fixed window panel and of the movable window panel form a generally flush surface when the movable window panel is at least partially closed. Preferably, a guide member is secured to the inner surface along at least one of the perimeter edges of the movable window panel. The guide member is slidably engagable with the dividing member or members. Preferably, a resilient seal is included along the perimeter frame to reduce air and/or water leakage between the window panel and the frame. The resilient seal may be integrally molded with the frame and may vary in cross section along different regions of the perimeter frame.

In one form, the window assembly is adapted for a side door of the vehicle. The window assembly includes a rearward fixed panel and a forward movable window. The fixed panel is secured to a dividing member and a rearward leg of the frame, while the movable window is slidable between the dividing member and a forward leg of the frame. The guide member along the inner surface of the movable window slidably engages the dividing member such that the movable window and fixed window panel form a generally continuous, flush surface when the movable panel is at least partially closed.

In another form, the window assembly is adapted for a back lite of a vehicle and comprises a pair of opposite side fixed window panels mounted at and between a perimeter leg and dividing member of the window frame assembly. The movable window panel slidably engages each of the pair of dividing members and provides a continuous, flush surface between the fixed window panels and the movable window panel when the movable window panel is at least partially closed. A pair of guide members is provided at an inner surface of the movable window panel, one along each side edge of the window panel such that one guide member slidably engages the dividing member at each side window.

Preferably, the guide member or dividing member comprise a generally C-shaped channel, while the other comprises an inward extension which slidably engages the C-shaped channel. A slidable seal is provided between the extension and the C-shaped channel to allow slidable movement therebetween, while preventing water or the like from penetrating from the outside of the window assembly to the interior of the vehicle.

Therefore, the present invention provides a vehicular window assembly which includes at least one fixed window panel and a movable window panel which form a substantially flush and continuous surface between the window panels. This results in a more aesthetically pleasing surface continuity while reducing wind noise when the vehicle is in motion. An additional benefit is that fewer parts are required to substantially seal the two window panels to the frame at the vehicle, while still allowing for easy raising and lowering of the movable window panel. The window module may be inserted into a recess of a vehicle panel or door and secured thereto with a minimal number of fasteners.

These and other objects, advantages, purposes and features of this invention will become apparent upon review of the following specification in conjunction with the drawings.

DESCRIPTION OF THE PREFERRED EMBODIMENTS

Figure 1:
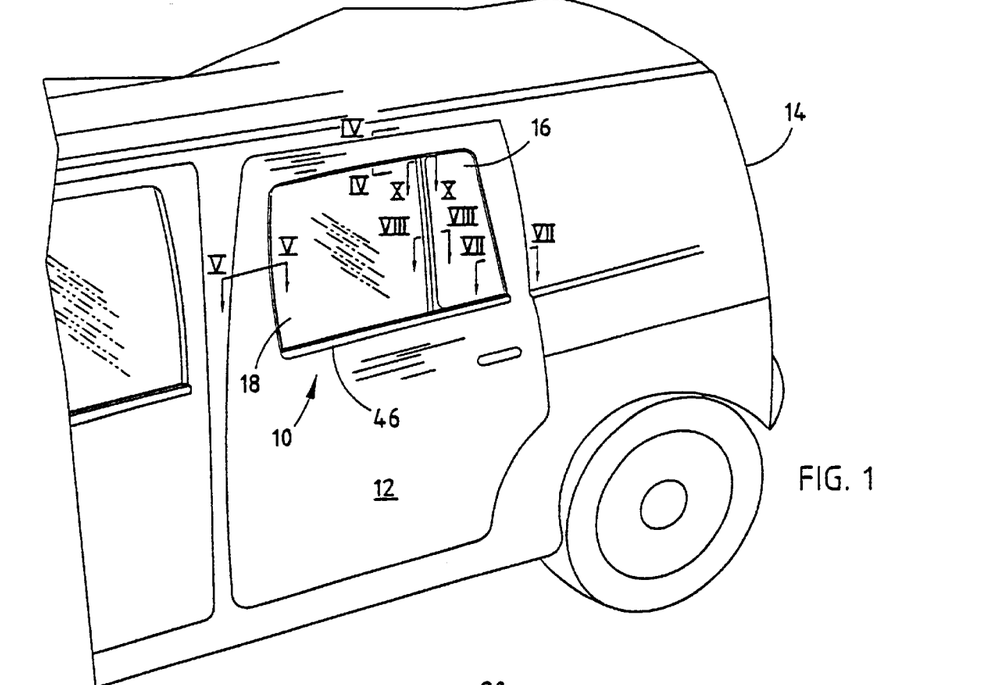
FIG. 1 is a perspective view of a vehicle incorporating a rear side door window assembly of the present invention.
Figure 2:
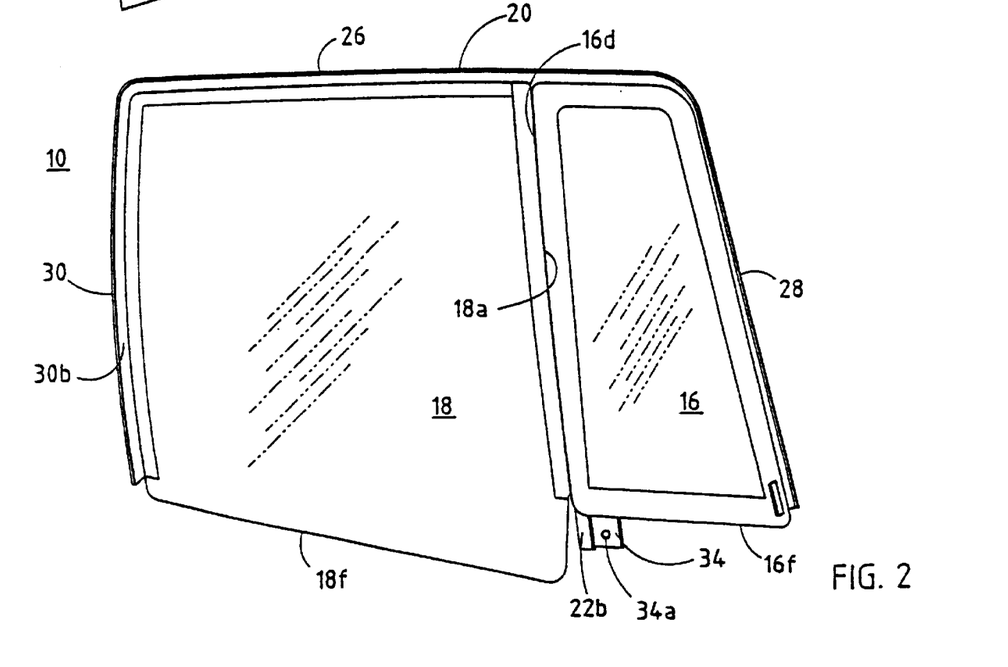
FIG. 2 is an outside perspective view of the window assembly of FIG. 1.
Figure 3:
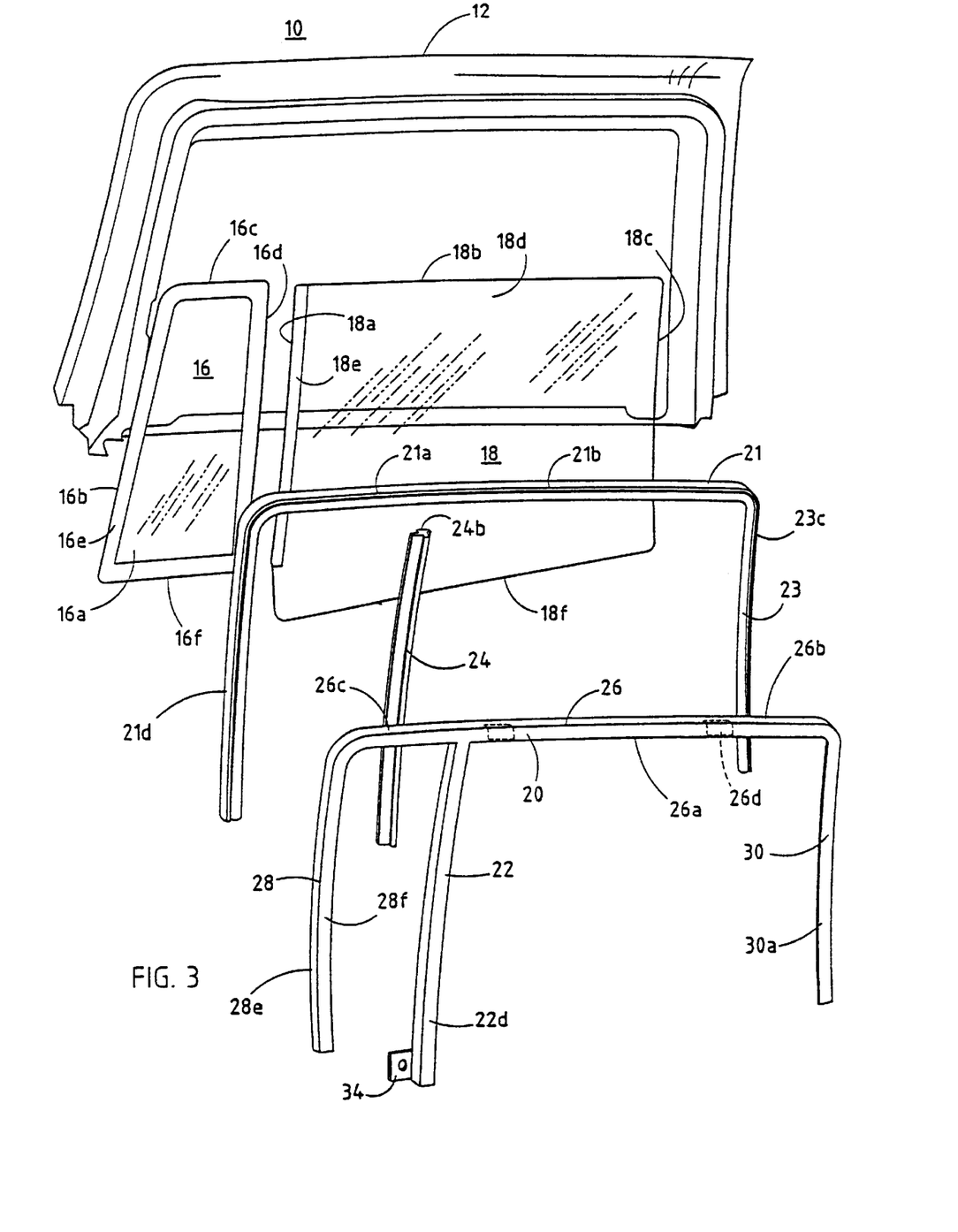
FIG. 3 is an exploded inside perspective view of the window assembly of FIG. 1, as viewed from an interior side of the window assembly.

Referring now specifically to the drawings and the illustrative embodiments depicted therein, there is shown in FIG. 1 a door window assembly 10 implemented in a rear side door 12 of a vehicle 14. Window assembly 10 is preferably a modular assembly which may be installed at a door or panel of a vehicle and substantially encases a fixed vent window panel or window 16 and a larger generally rectangular and movable window panel or window 18. Movable window 18 may be lowered into vehicle door 12 to provide an opening through the window assembly, as is known in the art. As shown in FIGS. 2 and 3, window assembly 10 includes a generally E-shaped framing member 20 which substantially surrounds three of the four perimeter edges of each of window panels 16 and 18 and includes a dividing member 22 unitarily formed with framing member 20 and which separates or divides the two window panels. A sealing member 21 is positioned along frame 20 to substantially preclude water and/or air leakage into or out from the inside of vehicle 14. Sealing member 21 is preferably an inverted U-shape and corresponds to the U-shaped outer perimeter of frame 20 as shown in FIG. 3. Fixed window panel 16 is bonded or otherwise secured to dividing member 22 and a portion of frame 20, while movable window panel 18 slidably engages divider 22 and a forward portion or leg 30 of frame 20. A rail or guide member 24 (FIGS. 3, 8A and 8B) is preferably bonded or otherwise secured along a rearward edge 18a of movable window panel 18, such that rail member 24 slidably engages a channel or track 22a of dividing member 22. As shown in FIGS. 1, 2, 8A and 8B, this allows fixed window panel 16 and movable window panel 18 to be substantially flush-mounted relative to one another, such that an outer surface of both window panels form a generally smooth, flush, continuous planar surface, having no seal or trim molding extending outwardly between the adjacent edges of the window panels, thereby reducing aerodynamic drag and wind noise when the vehicle is in motion. Although described as having a flush surface, movable window 18 may be positioned slightly laterally outwardly from fixed window panel 16 and dividing member 22, in order to reduce or limit air flow between the window panels as the vehicle is being driven, as shown for example in FIG. 11. Also, although shown and described as having the movable window panel positioned forwardly of the fixed window with a rearward edge of the movable window panel being slidable along a forward edge of the fixed window panel, clearly the scope of the present invention includes other window or panel assemblies where a movable panel may be oriented in any other manner relative to one or more fixed panels or a second movable panel. For example, a vertical sliding window assembly may be implemented at a rear window of a pickup truck or the like, as shown in FIGS. 13–17 and discussed below. In order to simplify the discussion, the window assembly 10 will be described with respect to FIGS. 1–12 as having a movable panel positioned forwardly of a fixed panel at a side door of a vehicle. Preferably, window assembly 10 is a modular assembly, which is formed and assembled at a location remote from the vehicle assembly plant. The modular window assembly is then insertable as a unit into an appropriate opening in the vehicle and secured therein.

As best shown in FIG. 3, frame 20 is generally E-shaped, having an upper member 26, a rearward leg 28 and a forward leg 30, along with dividing member 22. Frame 20 and dividing member 22 are integrally formed or molded in one piece of a substantially rigid material. Preferably, this material is a rigid plastic, such as polyethylene terephthalate (PET), polypropylene, nylon, acrylonitrile-butadeine-styrene (ABS) or thermoplastic urethane (TPU). However, frame 20 may be otherwise formed from a formable metal material, without affecting the scope of the present invention. Upper member 26, rearward leg 28 and forward leg 30 substantially surround or encase the window panels 16 and 18 of window assembly 10 except for the bottom or lower perimeter edges of the window panels, and may have different cross sections for receiving seal 21 and a portion of either movable window panel 18 or fixed window panel 16, as discussed below.

Fixed window 16 is shown generally in the shape of a truncated triangle and includes a rearward edge 16b, an upper edge 16c, a forward edge 16d and a lower edge 16f. However, fixed window 16 may be substantially rectangular-shaped or triangular-shaped, or other shape depending on the application, without affecting the scope of the present invention. A ceramic frit layer 16e or other known coating is preferably applied to an inner surface 16a of fixed window 16 along the outer perimeter edges thereof. The frit layer 16e is opaque and functions to facilitate adhering or bonding of the edges 16b, 16c and 16d of window 16 to frame 20 and dividing member 22, while also improving the overall appearance of the window, since the bonding surfaces are then not visible from the exterior of the window.

Movable window panel 18 is generally rectangular-shaped and preferably of a size greater than fixed vent window panel 16. Movable window panel 18 includes a rearward edge 18a, an upper edge 18b, a forward edge 18c and a lower edge 18f. An inner surface 18d of movable window panel 18 along rearward edge 18a preferably is also coated with a ceramic frit layer 18e or the like in a conventional manner. The frit layer 18e provides a bonding or attaching surface for bonding or otherwise securing a mounting surface 24b of rail member 24 to inner surface 18d of movable window panel 18 (FIGS. 8A and 8B) and also improves the appearance of the window assembly since the attaching surfaces will not be visible from the exterior of the vehicle. Movable window panel 18 is raised upwardly to a closed position or lowered downwardly to an open position in a conventional manner, such that forward edge 18c slidably engages forward leg 30 of frame 20 and a corresponding forward portion 23 of seal 21.

Preferably, fixed window panel 16 and movable window panel 18 are made of a clear or tinted glass. However, fixed window panel 16 and/or movable window panel 18 may be otherwise molded or formed from a plastic material, such as a polycarbonate material or the like, without affecting the scope of the present invention.

Figure 4A:
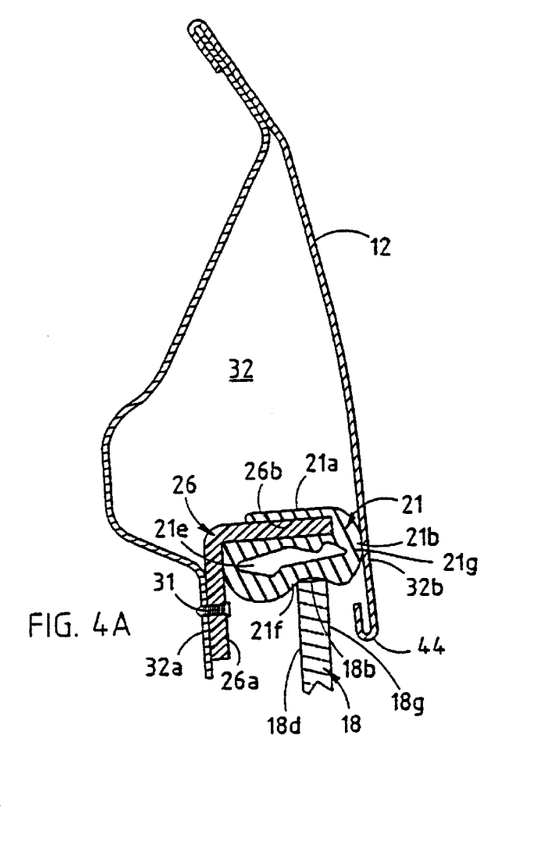
FIG. 4A is a sectional view along the line IV—IV in FIG. 1.
Figure 4B:
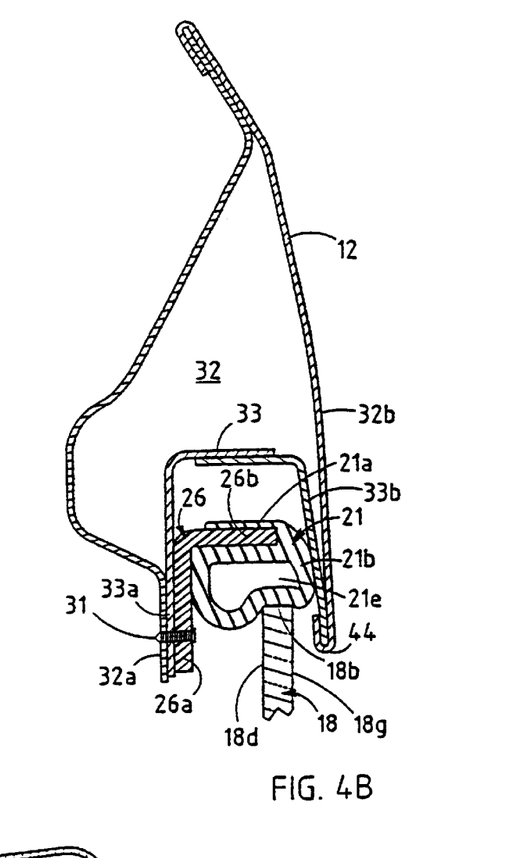
FIG. 4B is a sectional view similar to FIG. 4A, with a spacing bracket installed within the doorframe.

Referring now to FIG. 4A, upper member 26 of frame 20 may have a substantially L-shaped cross section in a region forward of divider 22 for receiving upper edge 18b of movable window panel 18 when window panel 18 is closed. The L-shaped region of upper member 26 includes an attaching portion 26a and a seal retaining portion 26b. A plurality of fasteners 31 are preferably included along attaching portion 26a of upper member 26, in order to secure window assembly 10 within vehicle door 12. Preferably, the sheet metal and/or plastic trim of vehicle door 12 may form a substantially U-shaped channel 32 for receiving upper member 26 of frame 20 therein. Attaching portion 26a of upper member 26 is then secured to a downwardly extending inner wall 32a of vehicle door 12, such that seal-retaining portion 26b extends substantially horizontally and outwardly therefrom. As shown in FIG. 4B, vehicle door 12 may further include one or more brackets 33 positioned within and along U-shaped channel 32 which function to maintain the U-shaped channel 32 in vehicle door 12 at a substantially constant width across the upper portion of vehicle door 12, as is known in the art. Bracket 33 may extend along U-shaped channel 32 or may include several brackets spaced apart along channel 32. Attaching portion 26a of upper member 26 may then be fastened to an inner leg 33a of bracket 33 and/or inner wall 32a of vehicle door 12. Upper member 26 may also be formed to fit along inner wall 32a with recesses 26d (FIG. 3) formed along attaching portion 26a to fit around brackets 33, such that upper member 26 provides a substantially uniform engagement with both the inner legs 33a of brackets 33 and the inner wall 32a of vehicle door 12.

Figure 5:
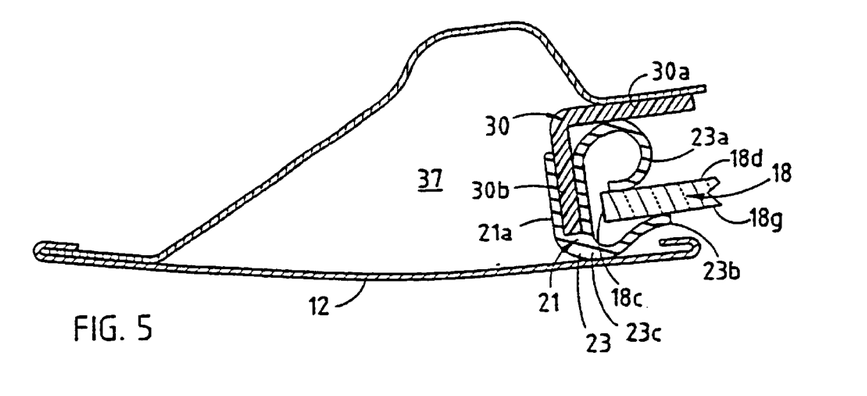
FIG. 5 is a sectional view along the line V—V in FIG. 1.

As shown in FIG. 5, the cross section of forward leg 30 is preferably substantially similar to the cross section of upper member 26 with an attaching portion 30a being secured within a channel 37 formed in door 12 while a seal retaining portion 30b extends outwardly therefrom.

Figure 7:
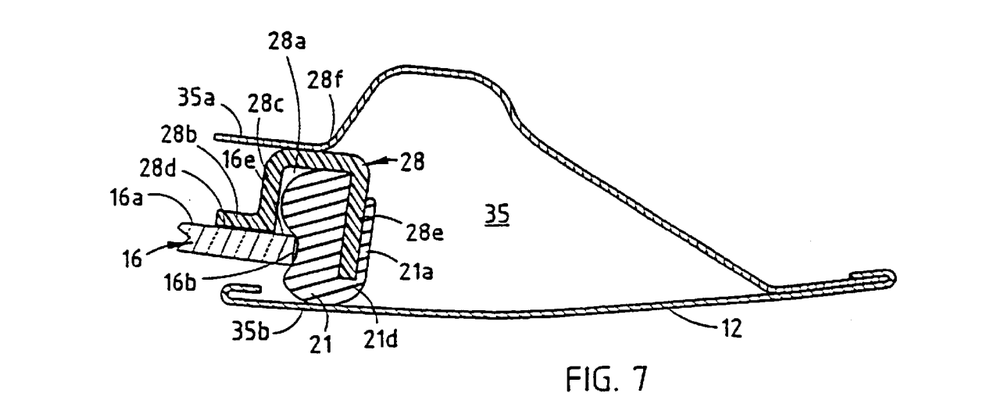
FIG. 7 is a sectional view along the line VII—VII in FIG. 1.

Referring now to FIG. 7, rearward leg 28 includes a generally U-shaped channel 28a along which a rear portion 21d of seal 21 is preferably positioned. The U-shaped channel 28a is preferably formed by an inner seal retaining portion 28e and an outer leg 28c interconnected at corresponding ends thereof by a base portion 28f. Rearward leg 28 is also positioned within a U-shaped channel 35 formed by the sheet metal, plastic or other material of vehicle door 12 similar to upper member 26, with base portion 28f extending along and engaging an inner wall 35a of a U-shaped channel 35 of vehicle door 12, while seal retaining portion 28e and outer leg 28c of U-shaped channel 28a extend outwardly therefrom.

A window mounting extension 28b extends forwardly from an end of outer leg 28c of U-shaped channel 28a. Window mounting extension 28b provides a substantially flat, smooth surface 28d on rearward leg 28, for mounting or bonding interior surface 16a along rearward edge 16b of fixed window panel 16 thereto. Optionally, mounting or bonding surface 28*d* may further include a plurality of projections (not shown) therealong to provide a predetermined gap between the bonding surface 28*d* and fixed window panel 16 to facilitate bonding of the components together. A rearward portion 26*c* of upper member 26 rearward of divider 22 may have a substantially similar cross section as rearward leg 28, such that interior surface 16*a* along upper edge 16*c* of fixed window panel 16 may be similarly secured or bonded to an upper mounting surface (not shown), in cases where fixed window panel 16 may be substantially truncated or rectangular shaped, as shown in FIGS. 1, 2, 3 and 12. Because frame 20 may be integrally molded from a rigid plastic material, such differences in the cross section of the frame in different regions may be provided by varying the mold in those areas, thereby providing a continuous framing member which allows for different attachment means for the window and/or seal therealong.

Figure 8A:
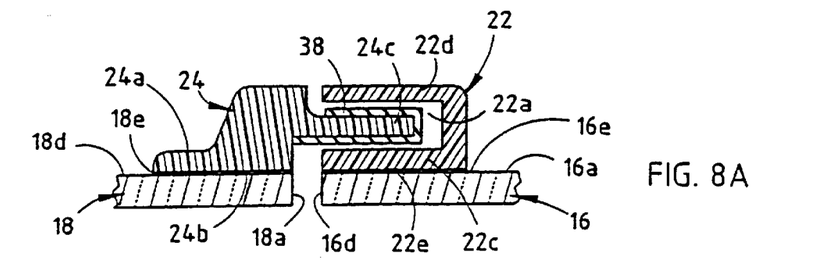
FIG. 8A is a sectional view along the line VIII—VIII in FIG. 1, with a seal attached to the rail of the present invention.
Figure 8B:
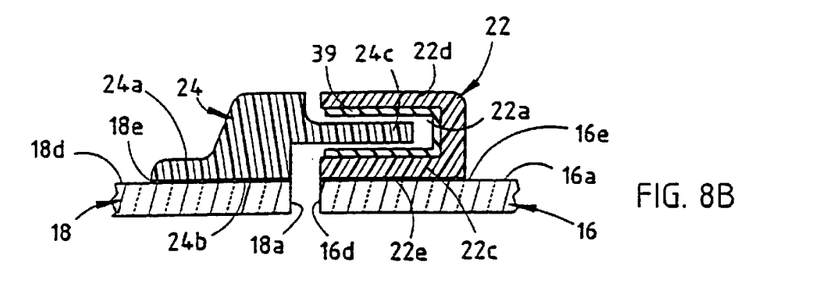
FIG. 8B is a sectional view similar to FIG. 8A with the seal attached to the frame divider.

Referring now to FIGS. 3, 8A and 8B, divider 22 is a substantially U-shaped channel member extending downwardly from upper member 26 and terminating at a point just below the lower ends of forward and rearward legs 30 and 28. A U-shaped channel 22*a* of divider 22 is preferably formed between an outer leg 22*c* and an inner leg 22*d*, which cooperate to receive slidable seal 38 or 39 (discussed below) and rail member 24 extending from movable window panel 18. Outer leg 22*c* further includes a mounting or bonding surface 22*e*, which provides a substantially smooth surface for securing inner surface 16*a* along forward edge 16*d* of fixed window panel 16 thereto. Preferably, inner surface 16*a* of fixed window panel 16 is adhered or bonded to mounting surface 22*e*. As discussed above with respect to bonding surface 28*d* of rearward leg 28, bonding surface 22*e* of divider 22 may include a plurality of protrusions or projections (not shown) for spacing fixed window panel 16 from bonding surface 22*e*, thereby facilitating bonding between the two components.

Divider 22 may further include a mounting bracket or tab 34 extending rearwardly from a lower end 22*b* of divider 22 (FIGS. 2 and 3). A mounting hole 34*a* is formed through bracket or tab 34, such that divider 22 of window frame 20 may be secured to vehicle door 12 with a fastener (not shown) through opening 34*a* and an upper portion of vehicle door 12. When secured by bracket 34, channel 22*a* of divider 22 is aligned with a lower channel (not shown), which is separately secured in the door and guides movable window 28 downward into vehicle door 12 when movable window panel 18 is lowered.

Referring again to FIGS. 3 and 8A, rail or guide member 24, includes a mounting or bonding flange 24*a*, which further includes a mounting or bonding surface 24*b* onto which inner surface 18*d* along rearward edge 18*a* of movable window panel 18 is secured, such as by bonding, adhesive or the like. Bonding surface 24*b* may include projections or protrusions (not shown) projecting outwardly therefrom to provide a predetermined space between frit layer 18*e* on inner surface 18*d* of movable window panel 18 and bonding surface 24*b* to optimize the bonding therebetween. Preferably, guide member 24 is formed or molded from PET, nylon or TPU material. Guide member 24 further includes a sliding portion or extension 24*c* which extends rearwardly from bonding portion 24*a* and is spaced inwardly therefrom. Sliding portion 24*c* slidingly engages U-shaped channel 22*a* of divider 22 to guide and seal movable window panel 18 as it is opened and closed. A slidable seal 38 may be bonded or otherwise secured to the sides and end of sliding portion 24*c*. Slidable seal 38 includes one or more lips or extensions (not shown) extending between seal 38 and divider 22, such that slidable seal 38 facilitates slidable engagement of rail member 24 by reducing friction with the U-shaped channel 22*a* of dividing member 22, while providing an substantially airtight seal between rail 24 and divider 22. Preferably, seal 38 is formed from ethylene propylene deine monomer (EPDM), santoprene, TPE, or the like, and is adhered to sliding portion 24*c* using a suitable adhesive. Alternately, as shown in FIG. 8B, a similar U-shaped seal 39 may be bonded or otherwise secured along the walls of the U-shaped channel of divider 22, such that slidable seal 39 slidably engages sliding portion 24*c* of rail member 24, again providing a substantially airtight seal between divider 22 and rail member 24. While facilitating sliding action by reducing friction, like seal 38, seal 39 is preferably formed from EPDM, santoprene, TPE or similar materials.

Referring now to FIGS. 3, 4A, 4B, 5 and 7, resilient seal 21 preferably extends around a perimeter portion of frame 20 which includes upper member 26 and forward and rearward legs 30 and 28. Similar to frame 20, resilient seal 21 is also preferably formed with varying cross sections in different regions of the perimeter frame 20 and, most preferably, also formed from different materials in different regions. For example, seal 21 may be formed from a soft material in an upper forward region 21*b* and a rearward region 21*d*, while being formed from a more rigid material along a forward leg portion or region 23. This results in improved sealing between window panels 16 and 18 and frame 20, while facilitating slidable engagement between movable window panel 18 and seal 21. Preferably, resilient seal 21 is formed or molded from ethylene propylene deine monomer (EPDM), santoprene and/or TPE material. Seal 21 includes an attaching flange or lip 21*a* (FIGS. 4A, 5 and 7) which is preferably substantially rigid for securing seal 21 to frame 20 by extending around and over seal retaining portions 26*b*, 28*e* and 30*b* on frame members 26, 28 and 30, respectively.

As shown in FIGS. 4A and 4B, upper, forward region 21*b* of seal 21 is preferably a bulbous seal, having a hollow, enclosed area portion 21*e* extending therealong which corresponds to a portion of upper member 26 extending forwardly of divider 22. This allows upper edge 18*b* of movable window panel 18 to easily compress seal 21 by engaging lowermost wall 21*f* of seal 21 and flexing the wall into hollow area 21*e* as the window is closed, thereby providing a substantially airtight seal between seal 21 and movable window panel 18. Upper portion 21*b* is preferably formed from a soft, compressible and flexible material, in order to provide a uniform seal along upper edge 18*b* of movable window panel 18 as upper edge 18*b* engages and compresses upper seal 21*b*. An outermost portion 21*g* of seal 21 engages the outer sheet metal wall 32*b* of the vehicle door 12, or the outer leg 33*b* of bracket 33, to seal the frame to the door and prevent air and water leakage therebetween.

Forward leg portion 23 (FIGS. 3 and 5) of seal 21 extends downwardly along forward leg 30 and is preferably molded from a more rigid material than the upper portion 21*b*, in order to facilitate sliding of forward edge 18*c* of movable window panel 18 along forward leg 30 and to prevent damage to seal 21 as movable window panel 18 is raised and lowered therealong. As shown in FIG. 5, forward leg 23 of seal 21 may provide a different seal configuration along forward leg 30 of frame 20 to further facilitate sliding forward edge 18*c* of movable window panel 18 therealong. This varying configuration may be in the form of a conventional lip seal or the like which forms a channel within which forward edge 18c of movable window panel 18 slidably engages. Preferably, forward region 23 of seal 21 includes a flexible inner lip 23a, a flexible outer lip 23b and attaching lip 21a. Inner lip 23a slidably engages inner surface 18d of movable window panel 18 and flexes inwardly as movable window panel 18 moves into contact therewith. Outer lip 23b similarly slidably engages an outer surface 18g of moveable window panel 18 and flexes outwardly as movable window panel 18 moves into contact therewith. Accordingly, when movable window panel 18 is opening and/or closing, forward edge 18c slides between inner lip 23a and outer lip 23b. When movable window panel 18 is at least partially closed, inner lip 23a and outer lip 23b of seal 21 engage movable window panel 18 and cooperate to substantially reduce air and/or water leakage around forward edge 18c of movable window panel 18. An outermost portion 23c of forward leg 23 engages the outer sheet metal wall of the door to substantially preclude air and water leakage therebetween.

As shown in FIG. 7, rearward portion 21d of seal 21 is preferably a substantially solid yet resilient sealing member extending along rearward leg 28 and rearward upper portion 26c of frame 20, although seal 21 may alternatively be a bulb seal in this region, similar to upper forward region 21b, without affecting the scope of the present invention. Seal 21 is again preferably a soft rubber-like material which allows the upper and rearward edges 16c and 16b respectively, of fixed window panel 16 to compress a portion of seal 21, thereby providing a substantially airtight seal between seal 21 and fixed window panel 16 when fixed window panel 16 is bonded or otherwise secured to frame 20. Because seal 21 is a unitarily molded seal which provides a substantially uniform and continuous attaching flange along sealing portions 21b, 23 and 21d at perimeter frame 20, an airtight seal may be provided in the corners of perimeter frame 20, as well as at the junction of dividing member 22 and perimeter frame 20.

When assembled, seal 21 is frictionally held to frame 20 along forward leg 30, upper member 26 and rearward leg 28. As shown in FIGS. 4, 5 and 7, attaching portions 21a and 23c of seal 21 overlap and extend around seal retaining portions 26b, 28e and 30b of frame 20, thereby substantially securing seal 21 to frame 20. Seal 21 is preferably retained along frame 20 due to a frictional engagement of the material of seal 21 with frame 20. Additionally, a stiffening member (not shown) may be included in the retaining portions 21a and 23c of seal 21 to prevent the lip from flexing, thereby substantially precluding seal 21 from being removed from frame 20 during the assembly processes of vehicle door 12. Clearly, however, seal 21 may be adhered, molded or otherwise secured to frame 20 without affecting the scope of the present invention.

Fixed window panel 16 is preferably bonded to frame 20 along rearward portion 26c of upper member 26 and along rearward leg 28. More specifically, as shown in FIG. 7, bonding extension 28b of rearward leg 28 is bonded to frit layer 16e on inner surface 16a along rearward edge 16b of fixed window panel 16. Similarly, a corresponding bonding extension along upper member 26 rearward of divider 22 may be bonded to frit layer 16e on inner surface 16a along upper edge 16c of fixed window panel 16. Fixed window panel 16 is bonded or adhered to the mounting extensions of frame 20 such that upper and rearward edges 16c and 16b engage with corresponding portions of seal 21, thereby compressing seal 21 to provide a substantially airtight seal therebetween. As shown in FIG. 7, this also results in seal 21 being pressed outwardly to further engage an outer side wall 35b of channel 35 of vehicle door 12, thereby substantially precluding air and/or water from passing therebetween. Additionally, as shown in FIGS. 8A and 8B, mounting surface 22e of divider 22 may be similarly bonded or adhered to frit layer 16e on inner surface 16a along forward edge 16d of fixed window panel 16. Fixed window panel 16 is thus bonded or otherwise secured to frame 20 along three of its perimeter edges, thereby substantially securing fixed window panel 16 within window assembly 10.

Rail member 24 may be similarly bonded or adhered to frit layer 18e on inner surface 18d along rearward edge 18a of movable window panel 18. Mounting surface 24b of rail member 24 is secured to movable window panel 18, such that sliding portion 24c extends rearwardly from rearward edge 18a of movable window panel 18. Sliding portion 24c is also formed in a plane which is spaced inwardly from a plane defined by movable window panel 18.

When fully assembled, as shown in FIGS. 8A and 8B, movable window panel 18 and fixed window panel 16 are substantially flush-mounted relative to one another, since no additional exterior trim components are included on their outer surfaces along their adjacent edges. Because rail 24 is secured to movable window panel 18 and extends inwardly into the channel of divider 22 and is substantially sealed therewithin, an airtight seal is formed between movable window panel 18 and fixed window panel 16 without requiring any additional seals or trim pieces to fill the gaps therebetween. The end result is a substantially smooth, flush and continuous planar surface formed by the two window panels of window assembly 10, which further results in a more aesthetically pleasing surface continuity. The term "flush" is herein used to define a surface between the two window panels which is generally continuous and co-planar and is void of any outwardly protruding trim pieces. However, the term further includes a window surface where the movable or forward window panel may be slightly laterally offset outwardly from the fixed or rearward window panel to further reduce or limit air or water intrusion between the window panels as the vehicle is being driven. The absence of any outwardly protruding trim pieces between the window panels also may reduce wind noise when vehicle 14 is driven. An additional benefit of this design is that less parts are required to substantially seal the two windows together while still allowing for easy raising and lowering of movable window panel 18.

Preferably, the bonding process of the present invention utilizes two component urethane adhesives, similar to commonly assigned U.S. Pat. No. 5,853,895 issued to Lewno, which is hereby incorporated herein by reference. Alternately, the bonding processes may be substantially similar to the processes disclosed in commonly assigned U.S. Pat. No. 5,551,197 issued to Repp et al., which is also hereby incorporated herein by reference. However, although window assembly 10 is shown and described as having the fixed and movable window panels being bonded to their respective components, clearly the present invention includes other known methods of fixedly or adhesively securing the various elements together, or molding the frame members and/or seals to the window panels.

When installed within vehicle door 12, the perimeter frame 20, which comprises forward leg 30, upper member 26 and rearward leg 28, is inserted into the U-shaped channels formed in vehicle door 12, as shown in FIGS. 4A, 4B, 5 and 7. Divider 22 is then secured within vehicle door 12 with a fastener (not shown) through bracket 34 and a corresponding attaching point (not shown) within vehicle door 12. Additional fasteners 31 are preferably included to secure upper member 26 of frame 20 within the U-shaped channel 32 along the upper end of vehicle door 12. These fasteners may be threaded fasteners or Christmas tree fasteners or other push-fit type fasteners or the like and are installed in a conventional manner. Frame 20, seal 21 and fixed window panel 16 are thus substantially secured within vehicle door 12. Because movement of window assembly 10 is substantially precluded by the fasteners along upper member 26 and at attaching bracket 34 on divider 22, no additional fasteners are required to retain base portion 28f of rearward leg 28 and/or attaching portion 30a of forward leg 30 to door 12.

Figure 12:
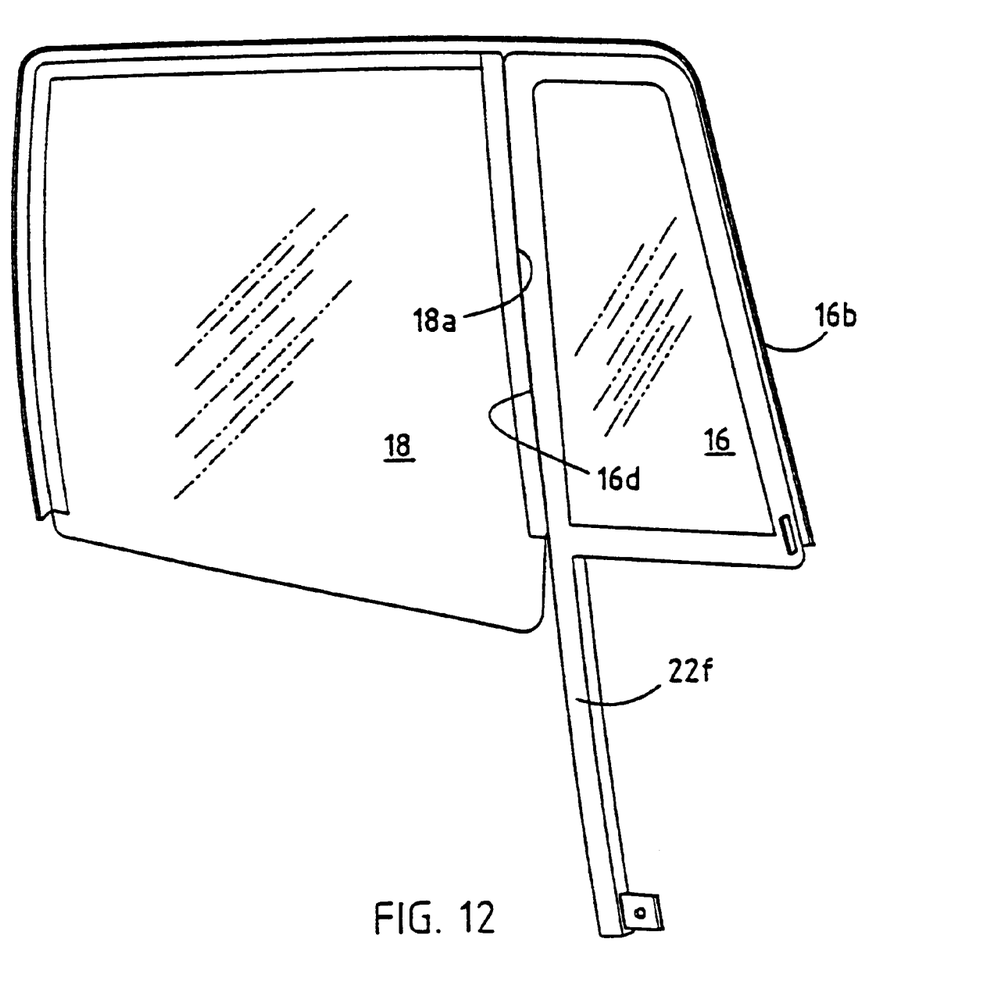
FIG. 12 is a view similar to FIG. 2 of an alternate embodiment of the present invention having a one-piece channel member which extends downward into the door of the vehicle.
Figure 13:
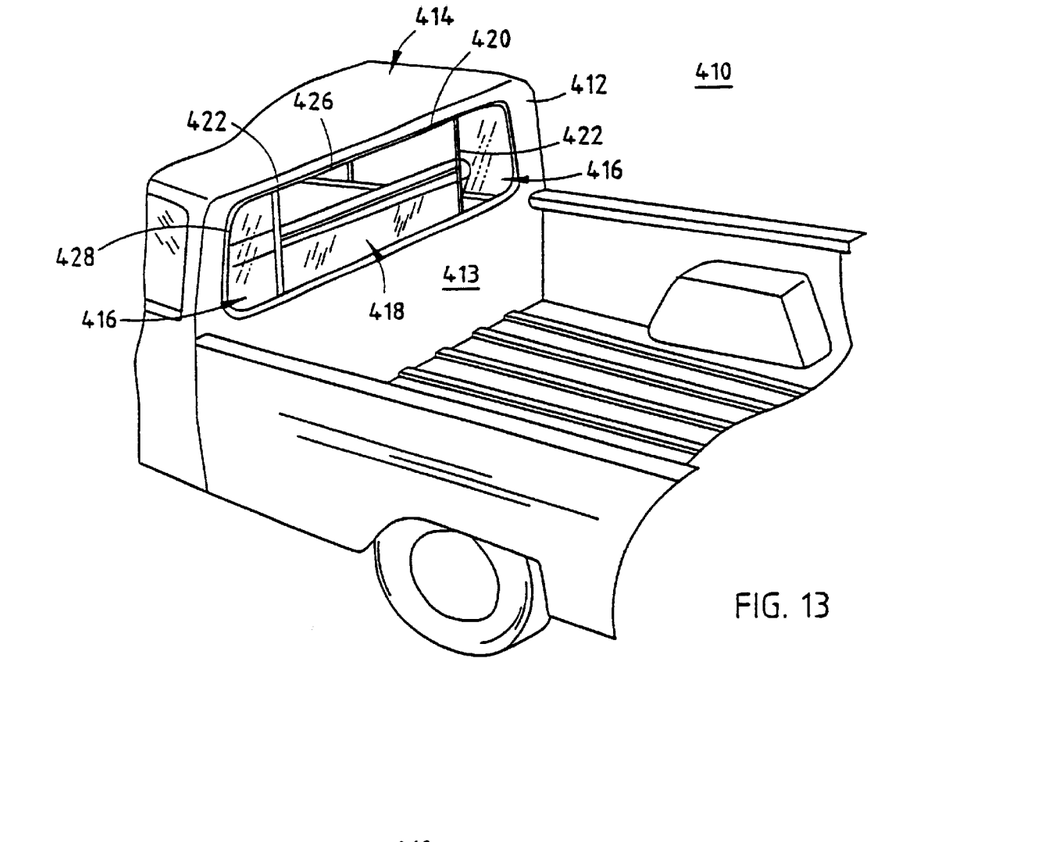
FIG. 13 is a rear perspective view of a vehicle incorporating a vertical sliding rear window in accordance with the present invention.

Once installed, movable window panel 18 may slide upwardly to a closed position and downwardly to an open position, while sliding portion 24c of rail member 24 slidably engages one or both of the U-shaped channel 22a of divider 22 and a lower channel (not shown) within vehicle door 12. Movable window panel 18 is preferably movable within vehicle door 12 in a conventional manner such that it may be raised or lowered by the window mechanisms (not shown) of vehicle door 12. Vehicle door 12 preferably also includes the lower channel member along which rail 24 is guided as movable window panel 18 is lowered below lower end 22b of divider 22. The lower channel member is aligned with and interconnected with lower end 22b of divider 22, such that there is a smooth transition therebetween as movable window panel 18 is raised and/or lowered within vehicle door 12. However, divider 22 may alternately be a one piece extended channel member 22f extending downwardly into vehicle door 12, as shown in FIG. 12, such that a separate, lower channel aligned within the door is not necessary, without affecting the scope of the present invention. As movable window panel 18 moves along divider 22, forward edge 18c of movable window panel 18 correspondingly slides between inner lip 23a and outer lip 23b of seal 21 along forward leg 30. Slidable seal 38 or 39 and inner and outer lips 23a and 23b provide a substantially airtight and watertight seal between rail 24 and divider 22 and forward edge 18c and forward leg 30, respectively, while allowing relative movement therebetween. As mentioned above, the slidable seal may be bonded to either rail 24 or within U-shaped channel 22a of divider 22 and slidably engage the other component, without affecting the scope of the present invention. A lower trim strip 46 (FIG. 1) is also preferably added to vehicle door 12 to substantially preclude water and/or air from entering and exiting vehicle door 12 along the lower edges of the window panels. Preferably, this seal allows for slidable engagement with movable window panel 18, as movable window panel 18 raises and lowers within vehicle door 12.

As shown in FIGS. 4A and 4B, when movable window panel 18 is in its fully upward or closed position, bulb seal 21b is substantially compressed by upper edge 18b of movable window panel 18, such that seal 21 extends outwardly from upper member 26 of frame 20. A portion of seal 21 thus engages an outer wall 32b and/or an outer leg 33b of channel 32 and bracket 33, respectively, thereby substantially precluding passage of air and/or water therebetween. The edges of fixed window panel 16 and upper edge 18b of movable window panel 18 may protrude into the U-shaped channels of vehicle door 12, such that a rounded over trim portion 44 of the vehicle door 12 provides a visible framing of the windows, thereby improving the overall appearance of the vehicle door. Alternately, other seals or trim pieces may be added to cover the edge of the sheet metal or plastic door trim, in order to provide a finished trim around the perimeter of the door frame.

Although seal 21 is shown and described as a separate seal which is push fit onto frame 20 of window assembly 10, it is further envisioned that seal 21 may be integrally molded to the perimeter segments of frame 20. For example, the E-shaped frame 20 and corresponding seal 21 may be molded in a two-shot molding process or may be integrally formed by two separate molds. This approach provides a window assembly with lower assembly costs which also results in an improved seal between the seal 21 and the frame 20. Additionally, this approach substantially precludes the possibility that the seal will be accidentally detached from frame 20 during the assembly of window assembly 10 to vehicle door 12. The integral molding of the seal to the frame also further facilitates forming a seal along the perimeter frame which has varying configurations therealong. A third shot molding process or an additional mold may also be included to mold different portions of the seal out of different materials and/or in different cross sectional forms, while still maintaining a substantially continuous seal around the perimeter frame.

Figures 6A, 6B:
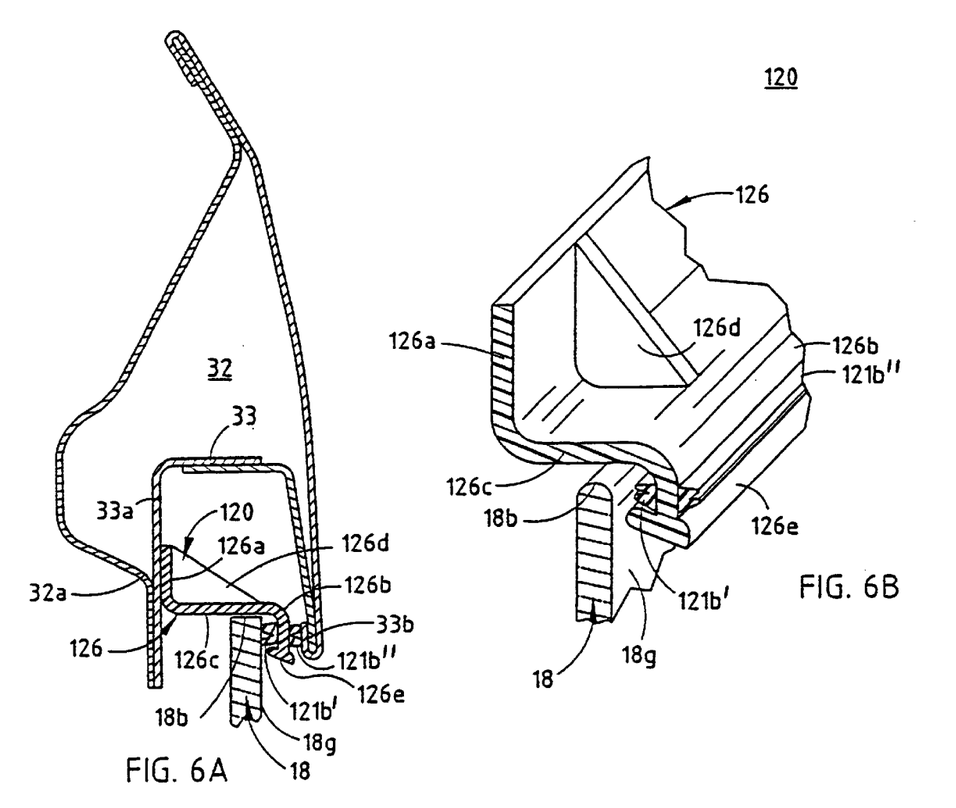
FIG. 6A is a sectional view similar to FIGS. 4A and 4B of an alternate embodiment of the frame of the present invention.
FIG. 6B is a perspective view of the frame of FIG. 6A.

Referring now to FIGS. 6A and 6B, a frame member 120 is substantially similar to frame 20 discussed above, except frame 120 includes an upper member 126, which includes a mounting portion 126a, a seal retaining portion 126b and a generally horizontal portion 126c extending therebetween. Mounting portion 126a is secured along inner leg 33a of bracket 33, similar to upper member 26 discussed above, and extends downwardly within sheet metal channel 32. Horizontal section 126c extends laterally outwardly from a lower edge of mounting portion 126a and curves downwardly to form seal retaining portion 126b. A resilient seal 121b is provided at either side of seal retaining portion 126b of upper member 126, such that an inward seal 121b' engages outer surface 18g of movable window 18 when movable window 18 is at or near its closed position, while an outer seal 121b" engages outer leg 33b of bracket 33 and/or an outer lip of the vehicle sheet metal. Preferably, a plurality of reinforcement sections or gussets 126d may be provided between attaching portion 126a and horizontal portion 126c, to enhance the strength and rigidity of the upper member 126. Movable window 18 is movable upwardly towards its closed position to a position laterally inwardly from seal retaining portion 126. Resilient seal 121b' may further include a bulbous portion (not shown) which is positioned beneath and along horizontal section 126c and which is compressible by upper edge 18b of movable window 18 as movable window 18 is closed. Similar to upper member 26 discussed above, upper member 126 may additionally or otherwise be secured along an inner wall 32a of the sheetmetal of vehicle door 12 or may be secured to both and include a plurality of recesses (not shown) spaced along mounting portion 126a. A reinforcement member or web 126e is provided along a lower edge of seal retaining portion 126b, to enhance the strength and rigidity of seal retaining portion 126b and to further enhance the securement of resilient seals 121b' and 121b" therealong. Similar to frame 20 discussed above, a forward leg of frame 120 is preferably substantially similar to the cross section of upper member 126, with a resilient seal provided along the seal retaining portion to allow for slidable engagement with a forward edge 18c of movable window 18.

Figure 9:
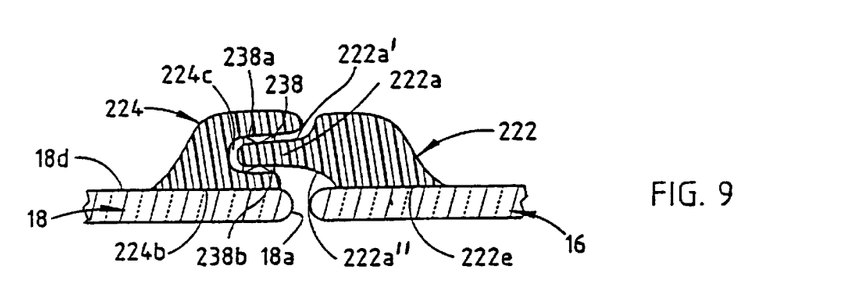
FIG. 9 is a sectional view similar to FIGS. 8A and 8B of an alternate guide and frame of the present invention.
Figure 10:
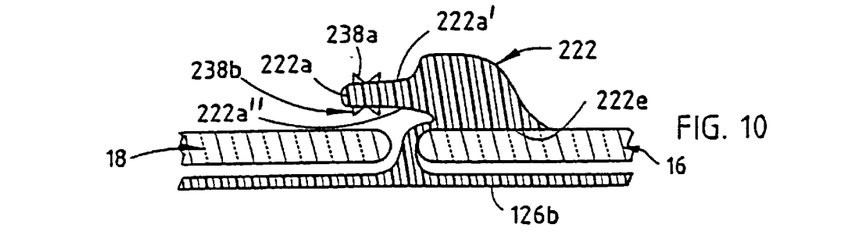
FIG. 10 is a sectional view along the line X—X in FIG. 1 with the frame and guide of FIG. 9.

Referring now to FIGS. 9 and 10, an alternate embodiment of the present invention comprises a molded dividing member 222 and a molded guide member 224. Similar to window assembly 10, discussed above, a fixed window panel 16 is secured along an outer mounting surface 222e of dividing member 222 and further secured along an upper portion and/or rearward leg portion of the framing member (not shown), while an outer mounting surface 224b of guide member 224 is secured along an edge 18a at inner surface 18d of movable window 18. The window panels 16 and 18 may be secured along the dividing member 222 and guide member 224 by a suitable adhesive, or may be bonded thereto, similar to dividing member 22 and guide member 24 of window assembly 10, discussed above. Preferably, dividing member 222 comprises a sliding portion or extension 222a which extends forwardly from dividing member 222 to engage a correspondingly formed channel 224c of guide member 224, such that channel or guide member 224 slidably receives extension 222a within channel 224c to allow slidable movement of movable window 18 relative to fixed window panel 16. Preferably, a resilient slidable seal 238 is provided between extension 222a and channel 224c to further guide and seal movable window panel 18 as it is opened and closed. Preferably, seal 238 is adhered or molded to extension 222a and comprises one or more lip member 238a and 238b extending outwardly from each side 222a' and 222a", respectively, of extension 222a. Preferably, slidable seal 238 is molded along extension 222a of dividing member 222 and, more preferably, molded therealong as a second shot of a two-shot molding process to form the frame and seals of the window assembly. However, the slidable seal may otherwise be molded or adhered to guide member 224 within channel 224c for slidable engagement with extension 222a of dividing member 222, without affecting the scope of the present invention.

As shown in FIG. 10, dividing member 222 is molded with and merges with an upper member, such as upper members 26 or 126, of the window frame. For example, in the illustrated embodiment, dividing member 222 is molded with seal attaching portion 126b of upper member 126 (FIGS. 6A and 6B) at an upper end of dividing member 222.

Figure 11:
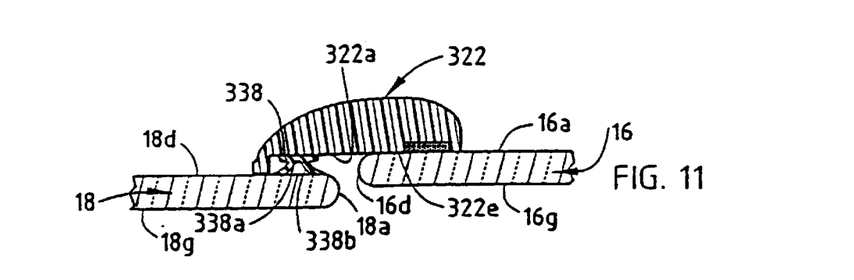
FIG. 11 a sectional view similar to FIGS. 8A, 8B and 9 of an alternate dividing guide/seal in accordance with the present invention.

Alternately, as shown in FIG. 11, movable window panel 18 may not include a guide member extending along rearward edge 18a of inner surface 18d of movable window panel 18. Rather, inner surface 18d of movable window panel 18 may slidably engage a sliding seal 338 at a dividing member 322, which is secured to inner surface 16a of fixed window panel 16 and extends forwardly therefrom. Preferably, a mounting surface 322e of dividing member 322 is adhesively secured or bonded to inner surface 16a of fixed window panel 16. Dividing member 322 extends forwardly from forward edge 16d of fixed window panel 16 and provides a seal mounting surface 322a, which is positioned along inner surface 18d of movable window panel 18 and spaced laterally inwardly therefrom with respect to the vehicle. Sliding seal 338 is secured along seal mounting portion 322a of dividing member 322, and is preferably molded therealong and, more preferably, molded therealong as a second shot in a two step or two shot molding process for molding the frame and seal of the window assembly. Preferably, sliding seal 338 includes a pair of laterally outwardly extending lips 338a and 338b, which form a generally Y-shaped seal, such that the lips 338a and 338b engage inner surface 18d of movable window panel 18 and flare and flex outwardly from one another to provide a substantially air/water tight seal at inner surface 18d along rearward edge 18a of movable window panel 18. Dividing member 322 thus provides a slidable sealing engagement with movable window panel 18 which substantially limits or precludes air and water intrusion into and out from the vehicle interior, while providing a generally flush, continuous surface (including a slightly offset surface) between outer surfaces 18g and 16g of movable window panel 18 and fixed window panel 16, respectively. As seen in FIG. 11, even though the surfaces are described as providing a flush continuous surface, movable window panel 18 or the forward window panel is preferably spaced slightly laterally outwardly from the fixed or rearward window panel, to further limit or preclude air and/or water intrusion into or out from the vehicle compartment when the vehicle is being driven.

Figure 14:
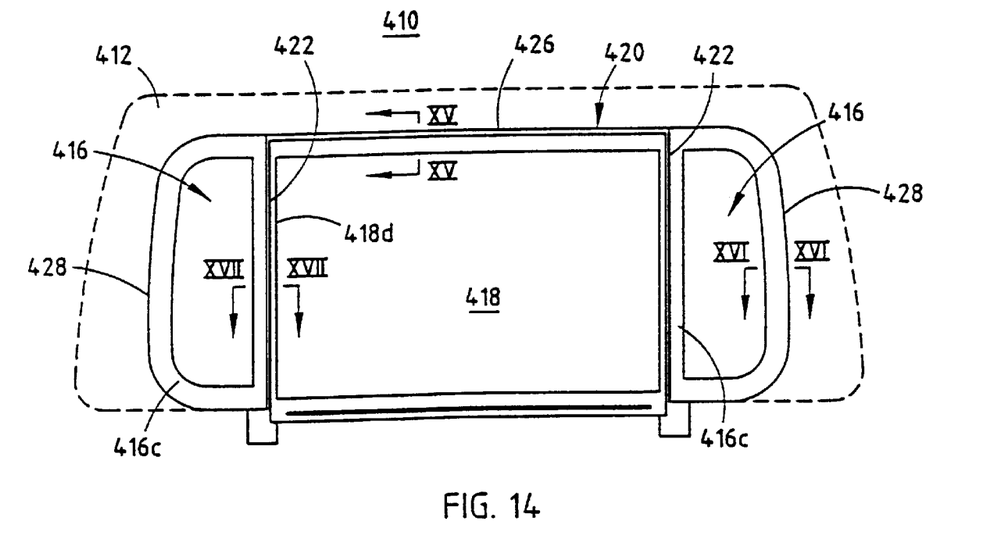
FIG. 14 is a rear elevation, looking forwardly with respect to the vehicle, of the vertical sliding window assembly of FIG. 13.

Referring now to FIGS. 13–17, a window assembly 410 is implemented in a rear panel 412 of a vehicle 414, such as a pickup truck or the like. Window assembly 410 is preferably a modular assembly which may be installed at panel 412 of vehicle 414 and substantially encases a pair of side fixed window panels 416 and a larger generally rectangular vertically movable window panel 418 slidably positioned between fixed window panels 416. Movable panel 418 may be lowered into rear panel 412 of vehicle 414 along a pair of tracks (not shown) within a lower rear panel 413 of vehicle 414. As shown in FIG. 14, window assembly 410 includes a framing member 420 which substantially surrounds fixed window panels 16 and movable window panel 18 along the upper and side perimeter edges thereof, and includes a pair of dividing members 422 unitarily formed in one piece with framing member 420. Framing member 420 preferably comprises an upper framing member 426 and a pair of opposite side portions 428, which are curved or correspondingly formed with the shape of fixed window panels 416. As seen in FIG. 14, side portions 428 of frame 420 may be generally C-shaped to accommodate attachment of the curved fixed window panels 416. Dividing members 422 separate each fixed window panel 416 from a corresponding edge of movable window panel 418. Preferably, a resilient seal 421 (FIGS. 15 and 16) is positioned along frame 420 to substantially preclude water and/or air leakage into or out from the passenger compartment of vehicle 414.

Similar to window assembly 10 discussed above, window assembly 410 is preferably a modular assembly which is manufactured and assembled at a window assembly plant which is located remotely from a vehicle assembly plant. The window assembly module is then installed into an opening or recess in the rear panel 412 of the vehicle 414 at the vehicle assembly plant. Window assembly 410 is preferably a powered vertical sliding window assembly, such that movable window 418 is electrically raised and lowered via a power drive system, as is known in the art. However, window assembly 410 may comprise a manually movable window panel 418, without affecting the scope of the present invention. The window 418 is lowered into lower panel 413 of vehicle 414 along tracks (not shown) within the panel.

Figure 15:
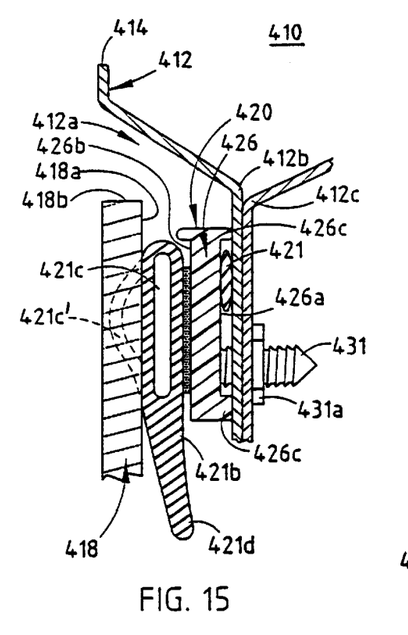
FIG. 15 is a sectional view along the line XV—XV in FIG. 14.

As shown in FIG. 15, upper member 426 of frame 420 has a generally rectangular cross section and comprises an inner seal retaining surface 426a and an outer seal retaining surface 426b. Upper member 426 fits within a recessed region 412a of rearward panel 412 of vehicle 414 and is secured to an outer sheetmetal wall 412b and an inner sheetmetal wall 412c of rearward panel 412 via a plurality of fasteners 431. Fasteners 431 may be a threaded stud or bolt which are secured to inner and outer sheetmetal walls 412c and 412b via correspondingly threaded nuts 431a. Each fastener 431 may be secured partially within upper members 426 and extend from inner seal retaining surface 426a. Preferably, a pair of forwardly extending tabs or legs 426c extend forwardly along seal surface 426a and engage outer sheet metal wall 412b as upper portion 426 is secured thereto.

Preferably, an upper bead or seal 421 is secured along seal retaining surface 426a of upper member 426 and is compressedly positioned between upper member 426 and outer sheetmetal wall 412b, to substantially seal upper member 426 to rear wall 412 of vehicle 414. Preferably, seal 421 is a substantially solid yet resilient sealing member, such as a sealing bead or the like extending along upper member 426. Seal member 421 preferably initially has a generally circular cross section and is thus compressed to a generally oval form when upper member 426 is secured to outer and inner sheetmetal walls 412b and 412c.

Additionally, a resilient window seal 421b is secured along outer seal surface 426b of upper member 426 and provides slidable engagement with inner surface 418a of movable window panel 418 along an upper edge 418b thereof. Preferably, window seal 421b is adhered to or bonded along outer seal surface 426b of upper member 426. Window seal 421b preferably comprises a bulbous portion 421c and a downwardly and forwardly extending guide portion 421d, which extends downwardly from bulbous portion 421c and forwardly with respect to the vehicle. Guide portion 421d functions to engage upper edge 418b of movable window panel 418 as movable panel 418 is raised towards its closed position. Guide portion 421d guides upper edge 418b of movable under panel 418 along seal 421b such that window panel 418 slides upwardly along seal 421b and compresses bulbous portion 421c of window seal 421b as window panel 18 approaches its closed position. As shown in FIG. 15, bulbous portion 421c of seal 421b is initially expanded or non-compressed, as shown generally in phantom at 421c', when movable window panel 418 is at least partially opened. When window panel 418 is moved toward its closed position, inner surface 418a at upper edge 418b compresses bulbous portion 421c, such that a substantially air and watertight seal is formed between movable window 418 and rear panel 412 of vehicle 414.

Figure 16:
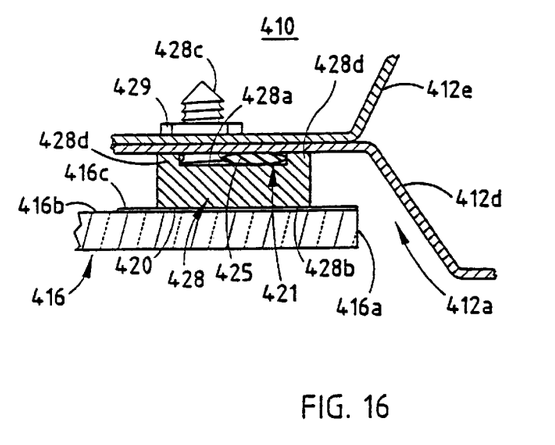
FIG. 16 is a sectional view along the line XVI—XVI in FIG. 14.

Referring now to FIG. 16, side portions 428 of frame 420 have a generally rectangular cross section and include an inner or forward sealing surface 428a and a rearward window surface 428b. Although the cross-section view of FIG. 16 is taken along a vertical portion of side portion 428, as shown in FIG. 14, side portion 428 of frame 420 is similarly formed along the upper and lower regions of frame 420 where fixed window panel 416 is secured. Similar to outer sheet metal wall 412b along upper frame member 426, an outer sheetmetal wall 412d extends around an outer edge 416a of fixed window panel 416 and further defines the recess 412a in which window assembly 410 is positioned. Preferably, a pair of forwardly extending tabs or legs 428d extend forwardly along seal surface 428a and engage outer sheetmetal wall 412d as side portion 428 is secured thereto. Preferably, window surface 428b of side portion 428 is adhesively secured or bonded to an inner surface 416b of fixed window panel 416. Preferably, window surface 428b is bonded along a ceramic frit layer 416c extending around the perimeter edge 416a of fixed window panel 416, similar to frit layer 16e of fixed window panel 16 discussed above. Side regions 428 of frame 420, and thus fixed window panel 416, are preferably secured to outer sheet metal 412d and an inner sheet metal 412e of rear panel 412 of vehicle 414 via one or more threaded studs or bolts 428c extending through outer and inner sheetmetal walls 412d and 412e and threadedly engaging correspondingly threaded nuts 429. Each fastener 428c is preferably secured within a correspondingly formed recess or opening (not shown) along seal surface 428a of side region 428 of frame 420, similar to fastener 431 of upper member 426. A bead or seal member 425 is secured or adhered along seal surface 428a of side portion 428 and engages outer sheetmetal wall 412d when side region 428 is secured thereto. Preferably, seal 425 is molded along seal portion 428a, and most preferably, is molded as a second shot of a two shot or two step process of forming the window assembly. Seal 425 preferably has a generally circular cross section when uncompressed, such that when side portion 428 of frame 420 is secured to the sheetmetal walls 412d, 412e of vehicle 414, seal 425 is compressed to a generally oval shape within the recess defined by sideframe 428 between seal surface 428a and outer sheetmetal wall 412d, thereby substantially sealing side portion 428 to the rear panel 412 of vehicle 414. Although shown as being secured by a threaded fastener, side portion 428 of frame 420 may be secured to sheetmetal walls 412d, 412e via any known fastening means, such as clips, push pins or the like.

Figure 17:
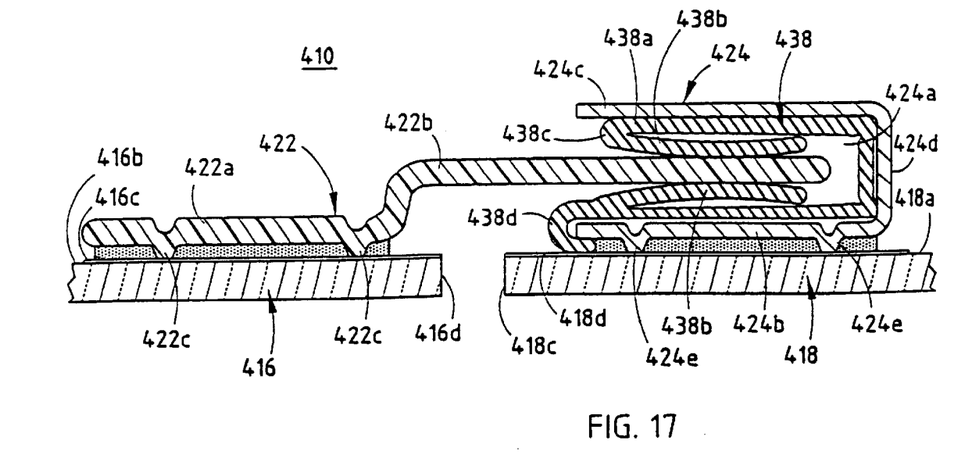
FIG. 17 is a sectional view along the line XVII—XVII in FIG. 14.

Fixed window panels 416 are thus secured at their inner surfaces to a corresponding portion of side portions 428 of frame 420. As best shown in FIG. 17, each fixed window frame 416 is further secured at its inner surface 416b to a dividing member 422 along a laterally inward edge 416d of fixed window panel 416. Dividing member 422 is preferably adhesively secured or bonded to a ceramic frit layer 416c at interior surface 416b along the perimeter edges of the fixed window panel 416b. Preferably, dividing member 422 comprises a mounting portion 422a and a rail portion 422b, which extends laterally inwardly from inner edge 416d of each fixed window panel toward and generally forwardly of movable window panel 418. Preferably, mounting portion 422a further includes a plurality of raised projections 422c to enhance bonding of dividing member 422 to fixed window panel 416, as discussed above with respect to dividing member 22.

Movable window panel 418 is vertically slidable along and between dividing members 422 of fixed window panels 416 via a pair of guide members 424, which extend along the laterally outward edges 418c at inner surface 418a of movable window panel 418. Preferably, guide members 424 are generally C-shaped channel members which slidably receive extension 422b of dividing members 422 within a channel 424a defined by a mounting portion 424b, a forwardly spaced guide portion 424c, and a forwardly extending connector 424d, similar to guide member 224 discussed above. Preferably, mounting portion 424b of guide members 424 is adhesively secured or bonded to a ceramic frit layer 418d at inner surface 418a along side edges 418c of movable window panel 418. Preferably, mounting portion 424b further comprises a plurality of projections or dimples 424e to enhance the bonding of mounting portion 424b to movable window panel 418, as discussed above.

A sliding seal 438 is provided within channel 424a of guide member 424 to slidably engage extension 422b of dividing members 422, and thus provide smooth sliding of movable window panel 418 relative to fixed window panels 416 and substantially preclude air and water intrusion between corresponding edges 416d and 418c of fixed window panels 416 and movable window panel 418, respectively. Preferably, seal 438 comprises a perimeter sealing body 438a which extends around channel 424a and the pair of lips or flanges 438b which extend inward into channel 424a from outer edges 438c of seal body 438a. Extension 422b of dividing members 422 inserts between seal flanges 438b, such that seal flanges 438b engaged along a portion of extension 422b to substantially seal the extension 422b therebetween. Preferably, seal 438 further includes a rearwardly extending lip 438d which extends around mounting portion 424b of guide member 424 and may further insert within a gap between mounting member 424b and inner surface 418a of movable window panel 418. The gap is created by the projections 424e. Alternately, the sliding seal may be secured to extension 422b and slidably engage guide member 424, similar to sliding seal 38 discussed above, without affecting the scope of the present invention. Although shown as a C-shaped guide member which slidingly receives an extension from each of the dividing members, clearly the vertical sliding rear window assembly may otherwise include a pair of C-shaped dividing members on the fixed windows which slidably receive an extension from a pair of corresponding guide members along each side edge of the movable window panel, similar to guide member 24 and dividing member 22, discussed above, without affecting the scope of the present invention. Alternately, movable window panel 418 or fixed window panels 416 may include a guide and seal member which provides a slidable seal which slidably engages an interior surface of the movable window panel, similar to dividing member 322, discussed above.

Similar to frame 20 and dividing member 22 of window assembly 10, frame 420 and dividing members 422 are preferably integrally molded in one piece of a substantially rigid plastic material, such as polyethylene teraphthalate (PET), polypropylene, nylon, acrylonitrile-butadeine-styrene (ABS), thermoplastic urethane (TPU) or the like. However, frame 420 may be otherwise formed from a formable metal material or other rigid materials, without affecting the scope of the present invention. Preferably, the frame and dividing members are formed in a first step or first shot of a two step molding process. The seal members 421 and 425 are preferably then molded to the corresponding frame portions in a second step or shot and/or third step or shot of a two or three step molding process.

Although the fixed window panels and movable window panels are described above as being conventional glass windows for an automobile, it is further envisioned that one or both of these windows or panels may be formed or molded from a polymer material, such as a polycarbonate material. The fixed polycarbonate panel may then be integrally molded with the frame members and/or the seal to provide an integral window or panel assembly. Such an approach substantially precludes gaps between the fixed panel and the frame to further reduce wind noise and/or leakage therebetween. Additionally, the movable polycarbonate or glass panel may be integrally molded with or bonded to the rail member to provide a one piece movable window which slidably engages the dividing member and the forward leg of the frame, while still providing a flush-mounted appearance between the two panels. The polycarbonate panels may be clear or colored and may further be hard coated if desired in order to reduce scratching thereon. Preferably, a protective coating may be applied to one or both of the polycarbonate panels in order to protect the panels from deterioration from exposure to the elements. This protective coating preferably comprises an organic hard coat, an inorganic hard coat, or an organic/inorganic compound. Additionally, the protective coating may include ultraviolet absorbers or stabilizers to protect the polycarbonate panels from UV radiation degradation. This coating or other additional coatings substantially reduces the susceptibility of the panels to abrasion and/or ultraviolet degradation, thereby providing a substantially clear and durable glass-like appearance to the panels.

Therefore, the present invention provides a window or panel assembly for use in a vehicle and especially a rear side door and/or a back lite of a vehicle which requires a minimal number of parts. Furthermore, the assembly module may be manufactured and assembled at a window assembly plant located remotely from the vehicle assembly plant and may then be easily installed to the vehicle at the vehicle assembly plant, since only a few fasteners are required to secure the assembly to the vehicle. Additionally, the present invention results in an improved appearance due to the substantially continuous flush surface between the fixed and movable windows or panels. By molding the frame and/or the seal, either separately or integrally, the overall appearance and performance of the frame and seal are also improved, since the one piece design substantially precludes seams or gaps from occurring in the corners or in the area immediately adjacent the connection of the divider to the upper member of the frame.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A window assembly module for a vehicle, said window assembly module comprising:
    at least one fixed window panel having an inner surface and an outer surface;
    a movable window panel having an inner surface and an outer surface; and
    a frame configured to secure to the vehicle, said inner surface of said at least one fixed window panel being secured to said frame, said movable window panel being movable relative to said frame, said frame including a portion separating said at least one fixed window panel and said movable window panel, said portion of said frame being adapted to maintain said outer surface of said movable window panel generally flush with said outer surface of said at least one fixed window panel as said movable window panel is moved relative to said frame.

2. The window assembly module of claim 1, wherein said frame includes a perimeter frame and said portion of said frame comprising at least one separating member, said inner surface of said at least one fixed window panel being secured to a perimeter portion of said perimeter frame and to said at least one separating member, said movable window panel being slidable relative to said at least one separating member.

3. The window assembly module of claim 2, wherein said perimeter frame includes opposing perimeter legs, said at least one separating member being positioned between said opposing perimeter legs.

4. The window assembly module of claim 2 further including at least one guide member secured to at least one perimeter edge of said movable window panel, said at least one guide member being slidably engagable with said at least one separating member.

5. The window assembly module of claim 4 further including a slidable seal positioned between said at least one guide member and said at least one separating member.

6. The window assembly module of claim 5, wherein said slidable seal is secured to said at least one guide member and slidably engages said at least one separating member.

7. The window assembly module of claim 5, wherein said slidable seal is secured to said at least one separating member and slidably engages said at least one guide member.

8. The window assembly module of claim 5 further including a resilient seal extending along said perimeter frame.

9. The window assembly module of claim 8, wherein said resilient seal and said slidable seal are molded to said frame.

10. The window assembly module of claim 9, wherein said resilient seal and said slidable seal are unitarily molded and comprise differing cross sectional forms.

11. The window assembly module of claim 4, wherein one of said at least one guide member and said at least one separating member comprises a channel and the other of said at least one guide member and said at least one separating member comprises an elongated extension, said channel slidably receiving said elongated extension therewithin.

12. The window assembly module of claim 2 further including a slidable seal positioned between said movable window panel and said at least one separating member.

13. The window assembly module of claim 12, wherein said slidable seal comprises a pair of laterally outwardly diverging lips which flex laterally outwardly relative to one another to engage said inner surface of said movable window panel.

14. The window assembly module of claim 1, wherein said frame comprises a rigid plastic material.

15. The window assembly module of claim 14, wherein said frame comprises one of polyethylene terephthalate, nylon, acrylonitrile-butadeine-styrene and thermoplastic urethane.

16. The window assembly module of claim 14 further including a resilient seal for sealing said at least one fixed window panel and said movable window panel to the vehicle, said seal being integrally molded along said frame.

17. The window assembly module of claim 1, wherein said window assembly module is adapted for installation at a side door of the vehicle.

18. The window assembly module of claim 1, wherein said window assembly module is adapted for use as a vertical sliding rear window for the vehicle.

19. The window assembly module of claim 18, wherein said window assembly module comprises a powered sliding mechanism for raising and lowering said movable window panel relative to said frame.

20. A rear window assembly module for a rear portion of a vehicle, said rear window assembly module comprising:
   a pair of fixed window panels, each of said pair of fixed window panels having an inner surface and an outer surface;
   a movable window panel having an inner surface and an outer surface; and
   a frame configured to secure to the vehicle, said inner surfaces of said pair of fixed window panels being secured to said frame, said movable window panel being movable relative to said frame, said frame including portions separating each of said pair of fixed window panels from said movable window panel, said portions of said frame being adapted to maintain said outer surface of said movable window panel generally flush with said outer surfaces of said pair of fixed window panels as said movable window panel is moved vertically relative to said frame.

21. The rear window assembly module of claim 20, wherein said rear window assembly module comprises a powered sliding mechanism for raising and lowering said movable window panel relative to said frame.

22. The rear window assembly module of claim 20, wherein said frame includes a perimeter frame having opposite legs and said portions of said frame comprise a pair of separating members between said opposite legs of said perimeter frame, each of said pair of fixed window panels being secured to respective ones of said legs and said separating members, said movable window panel being slidable along and between said pair of separating members.

23. The rear window assembly module of claim 22 further including a guide member secured to said inner surface along each of a pair of opposing perimeter edges of said movable window panel, said guide members being slidably engagable with said pair of separating members.

24. The rear window assembly module of claim 23 further including a slidable seal positioned between each of said guide members and a respective one of said separating members.

25. The rear window assembly module of claim 24, wherein each of said slidable seals is secured to a respective one of said guide members and slidably engages a respective one of said separating members.

26. The rear window assembly module of claim 24, wherein each of said slidable seals is secured to a respective one of said separating members and slidably engages a respective one of said guide members.

27. The rear window assembly module of claim 24 further including a resilient seal extending along said perimeter frame.

28. The rear window assembly module of claim 27, wherein said resilient seal and said slidable seals are molded to said frame.

29. The rear window assembly module of claim 28, wherein said resilient seal and said slidable seals are unitarily molded and comprise differing cross sectional forms.

30. The rear window assembly module of claim 23, wherein each of said guide members comprises a channel and each of said separating members comprises an elongated extension, said channels slidably receiving said elongated extensions therewithin.

31. The rear window assembly module of claim 23, wherein each of said separating members comprises a channel and each of said guide members comprises an elongated extension, said channels slidably receiving said elongated extensions therewithin.

32. The rear window assembly module of claim 22 further including a slidable seal positioned between said movable window panel and each of said pair of separating members.

33. The rear window assembly module of claim 32, wherein each of said slidable seals comprises a pair of laterally outwardly diverging lips which flex laterally outwardly relative to one another to engage said inner surface of said movable window panel.

34. The rear window assembly module of claim 20, wherein said frame comprises a rigid plastic material.

35. The rear window assembly module of claim 34, wherein said frame comprises one of polyethylene terephthalate, nylon, acrylonitrile-butadeine-styrene and thermoplastic urethane.

36. The rear window assembly module of claim 34 further including a resilient seal for sealing said fixed window panels and said movable window panel to the vehicle, said seal being integrally molded along said frame.

37. A window assembly module for a side door of a vehicle, said window assembly module comprising:
   a fixed window panel having an inner surface and an outer surface;
   a movable window panel having an inner surface and an outer surface; and
   a frame configured to secure to the vehicle, said inner surface of said fixed window panel being secured to said frame, said movable window panel being movable relative to said frame, said frame including a portion separating said fixed window panel and said movable window panel, said portion of said frame being adapted to maintain said outer surface of said movable window panel generally flush with said outer surface of said fixed window panel as said movable window panel is moved vertically relative to said frame.

38. The window assembly module of claim 37, wherein said frame includes a perimeter frame and said portion of said frame comprises a separating member, said inner surface of said fixed window panel being secured to a perimeter portion of said perimeter frame and to said separating member, said movable window panel being slidable relative to said separating member.

39. The window assembly module of claim 38, wherein said perimeter frame includes opposite perimeter legs, said separating member being positioned between said opposite perimeter legs.

40. The window assembly module of claim 39, wherein said perimeter portion of said perimeter frame comprises one of said perimeter legs, said movable window panel being slidably engagable with said separating member and the other of said perimeter legs.

41. The window assembly module of claim 38 further including a guide member secured to a perimeter edge of said movable window panel, said guide member being slidably engagable with said separating member.

42. The window assembly module of claim 41 further including a slidable seal positioned between said guide member and said separating member.

43. The window assembly module of claim 42, wherein said slidable seal is secured to said guide member and slidably engages said separating member.

44. The window assembly module of claim 42, wherein said slidable seal is secured to said separating member and slidably engages said guide member.

45. The window assembly module of claim 42 further including a resilient seal extending along said perimeter frame.

46. The window assembly module of claim 45, wherein said resilient seal and said slidable seal are molded to said frame.

47. The window assembly module of claim 46, wherein said resilient seal and said slidable seal are unitarily molded and comprise differing cross sectional forms.

48. The window assembly module of claim 41, wherein one of said guide member and said separating member comprises a channel and the other of said guide member and said separating member comprises an elongated extension, said channel slidably receiving said elongated extension therewithin.

49. The window assembly module of claim 38 further including a slidable seal positioned between said movable window panel and said separating member.

50. The window assembly module of claim 49, wherein said slidable seal comprises a pair of laterally outwardly diverging lips which flex laterally outwardly relative to one another to engage said inner surface of said movable window panel.

51. The window assembly module of claim 37, wherein said frame comprises a rigid plastic material.

52. The window assembly module of claim 51, wherein said frame comprises one of polyethylene terephthalate, nylon, acrylonitrile-butadeine-styrene and thermoplastic urethane.

53. The window assembly module of claim 51 further including a resilient seal for sealing said fixed window panel and said movable window panel to the vehicle, said seal being integrally molded along said frame.

* * * * *